Patented Jan. 7, 1947

2,413,842

UNITED STATES PATENT OFFICE 2,413,842

RESINOUS COMPOSITION

David J. Muir, Walker, Minn.

No Drawing. Application June 22, 1945,
Serial No. 601,058

1 Claim. (Cl. 106—219)

This invention relates to a resinous composition having rubber-like properties.

The invention relates to the production of resins, of the character described, obtained from the seed sacs of the berries of smilax.

This application is a continuation, in part, of my co-pending application for a resinous composition filed March 27, 1944, under Serial Number 528,539.

A specific example of berries used in the production of the composition is the berry of the *Smilax bona-nox*, commonly known as a stretchberry. However, the seed sacs of berries of other species of the genus Smilax may be successfully used if they are elastic. These seed sacs are composed principally of an elastic membrane which surrounds the seed kernel.

The seed sac is obtained in any practical manner. One method of separating the seed sacs from the berries may be carried out by placing a quantity of the berries in a mechanical shaker, or pebble mill, together with a larger quantity of metal balls or pebbles of somewhat greater diameter than the berries. The machine is then vibrated or rolled until the outer skins of the berries are removed.

The berry parts (seed sacs and kernels) are then screened from the metal balls or pebbles into a container having a screened bottom. The berry parts are rinsed with water to wash away any remaining skins.

The berry parts (rinsed seed sacs and kernels) are run through a grinder and ground fine enough to cut the seed sacs enough to allow the kernels to be unrestricted by the sacs. The mass thus produced should then be rinsed with water so as to loosen the berry parts and rinse out the soluble pulp. The stones or kernels, being heavier than the seed sacs, will settle. The seed sacs and outer skins are floated off to a separate container so that the seed sacs are collected unadulterated by any other portion of the berry.

The excess water should then be drained off and the moist sacs placed in a shallow container and covered with benzol. A roller is then run lightly over the seed sacs to force the water out and induce penetration of benzol into the sacs until a homogeneous, resinous mass is formed by dissolution. The rolling process compacts the mass.

The resinous mass produced as above will be hereinafter referred to as smilax resin.

The ultimate product sought may be obtained by mixing the following ingredients in the proportions stated, to wit:

| | Pounds |
|---|---|
| Smilax resin | 50 |
| Zinc oxide | 3 |
| Stearic acid | 0.25 |
| Captax (mercaptobenzothiazole) | 0.25 |
| Sulphur | 1.75 |

The above ingredients are, preferably, combined in the following manner: Twenty-five pounds of the smilax resin is rolled, cool, for approximately one hour on a mixing mill and the zinc oxide, stearic acid and Captax are added thereto during the rolling process. An additional twenty-five pounds of the smilax resin and the sulphur are then added and the rolling process is continued for a few minutes, approximately from five to ten minutes. The sheet thus produced is then vulcanized in a mold for approximately one hour at approximately 260 degrees F. and then emersed in water to cool and is then dried.

The Captax is to accelerate vulcanization. The stearic acid is required to actuate the Captax. Zinc oxide increases the tensil strength of the compound. The use of sulphur in the vulcanization, and its purpose, is well known.

What is claimed is:

A resinous composition consisting of 50 lbs. of smilax resin, 3 lbs. of zinc oxide, 0.25 lb. of stearic acid, 0.25 lb. of mercaptobenzothiazole, 1.75 lbs. of sulphur, mixed together and vulcanized at 260 degrees F. for sixty minutes in a mold.

DAVID J. MUIR.